(12) United States Patent
Matsuo et al.

(10) Patent No.: US 6,681,314 B1
(45) Date of Patent: Jan. 20, 2004

(54) FIFO MEMORY DEVICE SUITABLE FOR DATA TRANSFER APPARATUSES WITH DIFFERENT DATA BUS WIDTHS AND METHOD FOR CONTROLLING THE SAME

(75) Inventors: Syuji Matsuo, Kawasaki (JP); Koichi Kitamura, Kawasaki (JP); Katsuharu Chiba, Kawasaki (JP)

(73) Assignee: NEC Electronics Corporation (JP)

( * ) Notice: Subject to any disclaimer, the term of this patent is extended or adjusted under 35 U.S.C. 154(b) by 0 days.

(21) Appl. No.: 09/387,450

(22) Filed: Sep. 1, 1999

(30) Foreign Application Priority Data

Sep. 8, 1998 (JP) .......................... 10-253409

(51) Int. Cl.$^7$ ................................. G06F 13/00
(52) U.S. Cl. .................. 711/212; 365/219; 365/189.05; 710/307
(58) Field of Search .................... 710/52, 126, 127, 710/128, 307; 711/100, 154, 212, 149, 1, 211, 201; 365/221, 189.05, 230.05, 219

(56) References Cited

U.S. PATENT DOCUMENTS

| | | | | |
|---|---|---|---|---|
| 5,745,791 A | * | 4/1998 | Peek et al. | 710/52 |
| 5,768,546 A | * | 6/1998 | Kwon | 710/307 |
| 5,804,986 A | * | 9/1998 | Jones | 326/40 |
| 5,867,672 A | * | 2/1999 | Wang et al. | 710/127 |
| 6,172,927 B1 | * | 1/2001 | Taylor | 365/219 |
| 6,308,257 B1 | * | 10/2001 | Theogarajan et al. | 712/210 |

FOREIGN PATENT DOCUMENTS

| | | | | |
|---|---|---|---|---|
| EP | 0290172 | | 11/1988 | G06F/5/06 |
| EP | 0562746 | | 9/1993 | G06F/13/40 |
| GB | 2291230 A | * | 1/1996 | G06F/5/06 |
| JP | 60-17552 | | 1/1985 | G06F/13/00 |
| JP | 3-100851 | | 4/1991 | G06F/13/38 |
| JP | 4-64988 | | 2/1992 | G11C/7/00 |
| JP | 4-205873 | | 7/1992 | G11C/7/00 |
| JP | 5-204598 | | 8/1993 | G06F/5/06 |
| JP | 5-224880 | | 9/1993 | G06F/5/06 |
| JP | 6-83581 | | 3/1994 | G06F/5/06 |
| JP | 6-309145 | | 11/1994 | G06F/5/00 |
| JP | 11-110310 | * | 9/1997 | |
| JP | 10-105488 | | 4/1998 | G06F/13/00 |
| JP | 11-24888 | | 1/1999 | G06F/5/06 |
| KR | 98-25762 | | 7/1998 | H03K/19/00 |

* cited by examiner

Primary Examiner—P. Bataille
(74) Attorney, Agent, or Firm—Hayes Soloway P.C.

(57) ABSTRACT

A FIFO memory device for use in data transfer between data processing apparatuses having different data bus widths, has an input circuit 11 with a data bus width of k bits, an output circuit 12 with a data bus width of N×k bits (where N>1) that outputs data within the FIFO memory device, a writing pointer 2 that points to a data writing address of the FIFO memory device, a reading pointer 4 that points to a data reading address of the FIFO memory device, and a valid/invalid indicating circuit 6 that indicates whether or not data output to the output circuit 12 is valid.

4 Claims, 11 Drawing Sheets

FIFO MEMORY DEVICE SUITABLE FOR DATA TRANSFER APPARATUSES WITH DIFFERENT DATA BUS WIDTHS AND METHOD FOR CONTROLLING THE SAME

BACKGROUND OF THE INVENTION

1. Field of the Invention

The present invention relates to a FIFO memory device and a method for controlling such a FIFO memory device, and more particularly it relates to a FIFO that is suitable for data transfer between data processing apparatuses that have different data bus widths, and a method for controlling such a FIFO.

2. Description of the Related Art

One known FIFO and FIFO control method used for data transfer between data processes apparatuses having different data bus widths are, for example, the ones disclosed in Japanese Unexamined Patent Publication (KOKAI) No.4-64988.

Figure 17:
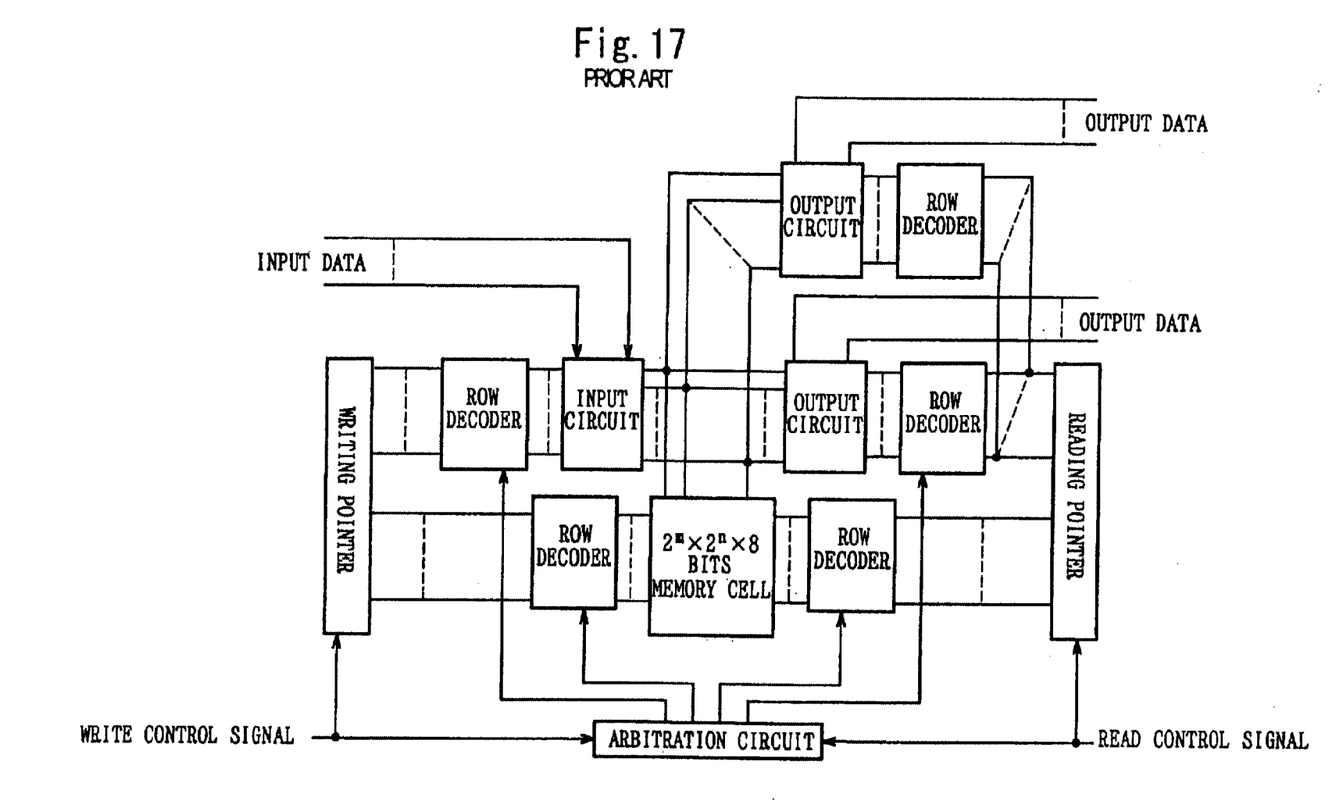
FIG. 17 is a block diagram that shows the prior art.

FIG. 17 is a block diagram of the above-noted prior art, this drawing showing a device that enables (N×k) bit writing and k-bit reading.

In the above-noted prior art, however, there is an arbitration function that prevents simultaneous access of the memory from the input port and the output port. For this reason, the device is not suitable for high-speed data processing.

SUMMARY OF THE INVENTION

Accordingly, it is an object of the present invention to improve on the above-noted drawback of the prior art, by providing a FIFO memory device that not only enables simultaneous reading and writing without having to perform bus arbitration, but also prevents skipped writing and double reading of data. It is a further object of the present invention to provide a method for controlling the above-noted FIFO memory device.

To achieve the above-noted object, the present invention has the following basic technical constitution.

Specifically, the first aspect of a FIFO memory device according to the present invention is used in data transfer between data processing apparatuses having different data bus widths from each other, comprising: an input circuit of said device with a data bus width of M×k bits (where M and k are integers greater than 1); an output circuit of said device with a data bus width of N×k bits (where N is an integer greater than 1, but being different from said M) that outputs read-out data from a memory provided within said FIFO memory device; a writing pointer that points to a data writing address of said FIFO memory device; a reading pointer that points to a data reading address of said FIFO memory device; and a valid/invalid indicating circuit which outputs data indicating whether or not said read-out data output to said output circuit is valid, to a peripheral circuit of said memory in every k bits, as one unit.

In the second aspect of the present invention, the data at an address indicated by said reading pointer is constantly output to said output circuit.

In the third aspect of the present invention, at each time when read-out data is output to said output circuit, said valid/invalid indicating circuit outputs a flag signal that indicates whether or not said read-out data is valid, and also outputs one flag signal in every k bits.

In the fourth aspect of the present invention, said flag signal comprising N bits.

In the fifth aspect of the present invention, the value of said reading pointer being incrementable only when all bits of said flag signal that is output from said valid/invalid indicating circuit indicate to be valid.

The method for controlling a FIFO memory device according to the present invention is used for data transfer between data processing apparatuses having different data bus widths from each other, and which comprising a writing pointer that indicates a data writing address, a reading pointer that indicates a data reading address, an input circuit of said device with a data bus width of M×k bits (where M and k are integers greater than 1), and an output circuit of said device with a data bus width of N×k bits (where N is an integer greater than 1, but being different from said M) that outputs read-out data from a memory provided within said FIFO memory device, wherein data at an address indicated by said reading pointer being constantly output to said output circuit, and further wherein a valid/invalid indicating circuit indicating whether or not said read-out data output to said output circuit is valid, said data output from said valid/invalid indicating circuit is output to a peripheral circuit of said FIFO memory device in every k bits as one unit.

Because in a FIFO memory device according to the present invention, for use in data transfer between data processing apparatuses having different data bus widths, has a writing pointer that indicates a data writing address, a reading pointer that indicates a data reading address, the data at an address indicated by the reading pointer being constantly output, it is possible to use this FIFO memory device for data transfer between data processing apparatuses having different data bus widths and enable high-speed transfer of data.

Additionally, the present invention prevents such problems as skipped writing and double reading of data without the need to use bus arbitration as was done in the past.

DESCRIPTION OF THE PREFERRED EMBODIMENTS

Embodiments of a FIFO memory device and a method for controlling a FIFO memory device according to the present invention are described below, with references being made to relevant accompanying drawings.

Figure 1:
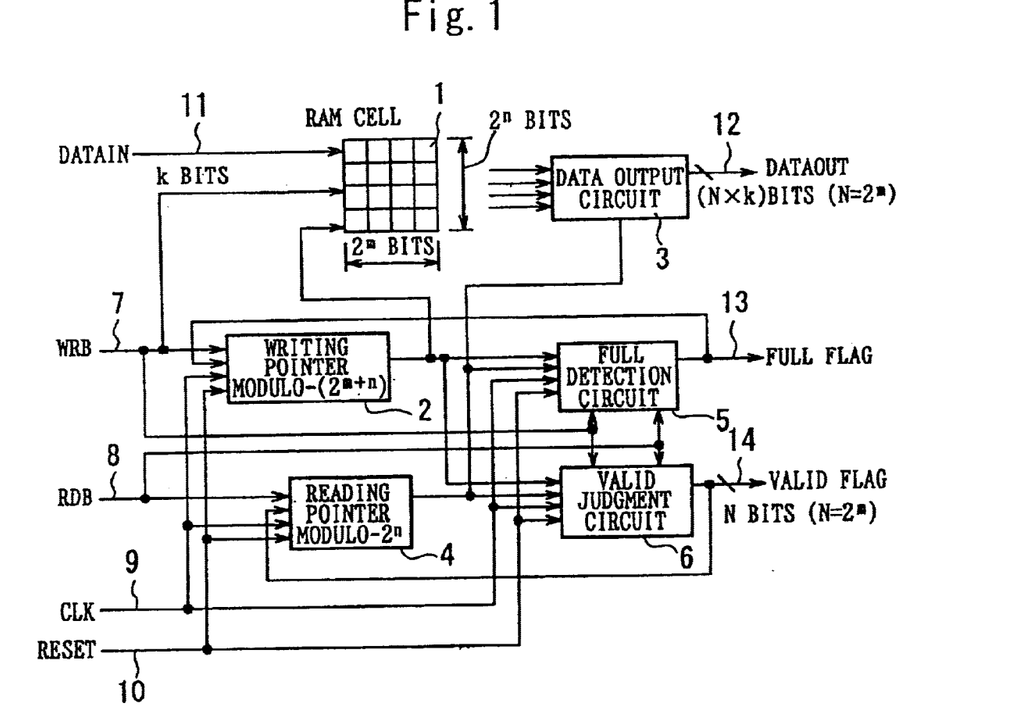
FIG. 1 is a block diagram that illustrates the first embodiment of a FIFO memory device according to the present invention.

FIG. 1 shows the block diagram of the first embodiment of a FIFO memory device according to the present invention, this being a Fifo memory device for the transfer of data between data processing apparatuses having different data bus widths. This FIFO memory device has an input circuit 11, which has a data bus width of k bits, an output circuit 12, which outputs reading data from the FIFO memory device and which has a data bus width of N×k bits (where N>1), a writing pointer 2 that indicates a data writing address in the FIFO memory device 1, a reading pointer 4 that indicates a data reading address in the FIFO memory device 1, and a valid/invalid indicating circuit 6, which indicates whether or not data output to the output circuit 12 is valid. In this FIFO memory device, data at the address indicated by the reading pointer 4 is constantly output to the output circuit 3.

Each time data is output to the output circuit 3, the valid/invalid indicating circuit 6 outputs a flag signal that indicates whether or not the read data is valid, and a flag signal 14 is output each k bits.

Figure 10:
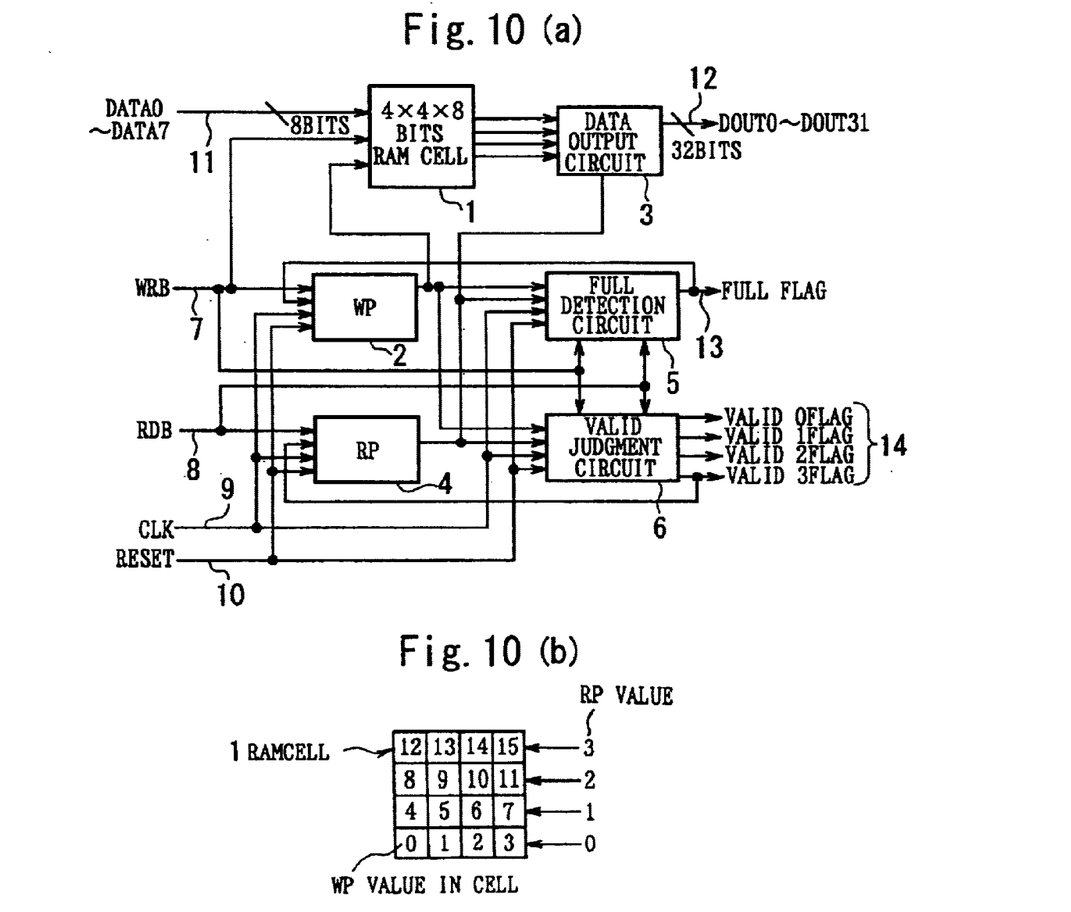
FIG. 10 is a block diagram that illustrates the first embodiment of the present invention.

Additionally, to simplify the description, FIG. 10 shows the positions in memory pointed to by the writing pointer and the reading pointer for the case of a $2^2 \times 2^2$ memory.

The writing pointer 2 is incremented based on a write request signal, and the data on the data input line 11 are written sequentially from the lower left address (WP=0 position) to the upper right address of RAM cell 1 as shown in the drawing (WP=15 position). Therefore, the writing pointer indicates the address in memory at which writing is possible. The reading pointer 4 is incremented when reading is performed so as to point to the next position from which reading is to be done. In the case of this drawing, four blocks are read at a time in one row from the left to the right.

The present invention is described below in further detail.

The FIFO memory device shown in FIG. 1 is formed by a RAM cell 1 that has a $2^m$ row×$2^n$ column structure ($2^m \times 2^n \times k$ bits of capacity), a data input line DATAIN 11 for writing k bits of data at an address in the RAM cell 1, an (m+n)–k bit writing pointer (hereinafter abbreviated WP) 2 that increments the writing address in the above-noted RAM cell 1 by one at a time, an (N (N=$2^m$)×k)-bit data output line DATAOUT 12, a data output circuit 3 that outputs (N×k) bits of data to the above-noted data output line DATAOUT 12, the n-bit reading pointer (hereinafter abbreviated RP) that increments the reading address in the above-noted RAM cell 1 by one at a time, a full detection circuit 5, which detects the condition whether or not the above-noted RAM cell 1 is full, a 1-bit output line 13 (hereinafter referred to as the full flag), which the full flag is output from the full detection circuit 5, valid judgement circuit (valid/invalid indicating circuit) 6 which indicates whether or not the data output to the above-noted output line DATAOUT 12 is valid, and an N-bit (where N=$2^m$) output (hereinafter referred to as the valid flag) 14 that is output from the valid judgment circuit 6.

A RESET signal (hereinafter simply referred to as RESET) of this FIFO memory device is supplied to the above-noted WP 2, RP 4, full detection circuit 5, and valid judgment circuit (valid/invalid indicating circuit) 6, and initializes each of these circuits.

Additionally, writing in this FIFO memory device is performed in accordance with a clock signal (hereinafter referred to as CLK) and a write request signal (hereinafter referred to as WRB), data at the above-noted data input line DATAIN 11 being written into the above-noted RAM address indicated by the value held in the writing pointer 2, after which the value of WP 2 is incremented by 1.

Reading of data is performed by selecting (N×k) bits of data, based on the value held in the above-noted RP 4, (N×k) bits of data being output to the above-noted output data line DATAOUT 12, the above-noted CLK and read request signal (hereinafter referred to as RDB) causing the RP value to be incremented by one, thereby switching to the next (N×k) bits of data.

The full detection circuit 5 outputs a 1-bit full flag, and is set when the following conditions relating the states of WP2 and RP 4 are satisfied, so as to detect the full condition of the RAM cell 1.

For $RP=0$, when $WP=2^{m+n}-1$

For $RP$ not 0, when $WP=RP \times 2^m -1$

Additionally, the valid judgment circuit 6 that is provided by the present invention supplies a N-bit output valid flag (where N=$2^m$), and is set and reset under the following conditions relating the states of WP 2 and RP 4, thereby indicating whether or not the data that is output to the data output line DATAOUT 12 is valid.

Figure 2:
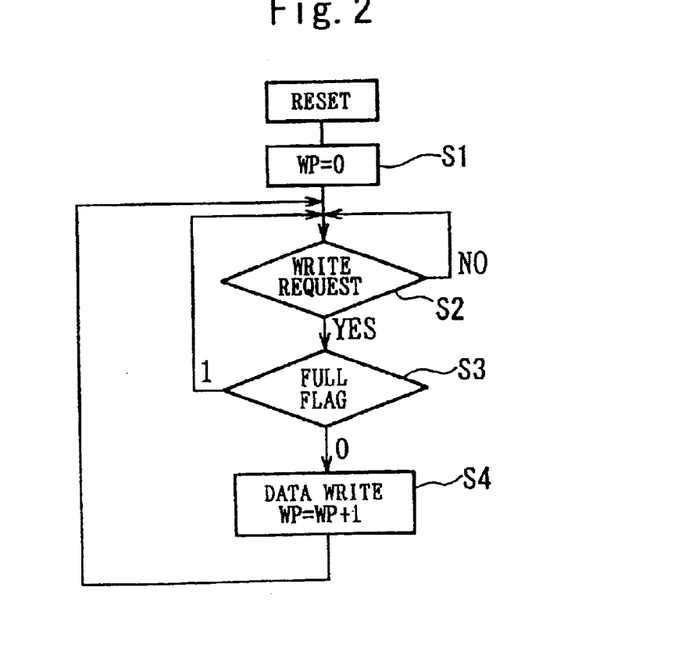
FIG. 2 is a flowchart that illustrates the operation of a writing pointer.

The flow of the above-noted writing operation is described below, with reference to FIG. 2. When resetting is done, WP 2 changes to 0 (step S1), and when a write request occurs, if the Full flag is 0, it is possible to write (steps S2 and S3), input data being written into the RAM cell 1, and the value of WP 2 being incremented by 1 (step S4).

Figure 3:
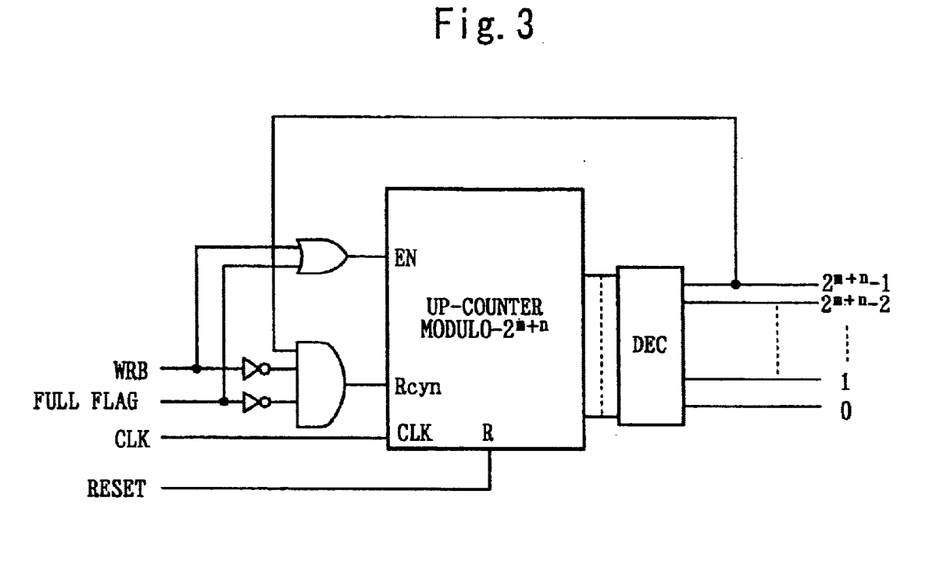
FIG. 3 is a block diagram of a writing pointer.

The writing pointer WP 2 shown in FIG. 1 is an up-counter, the more detailed configuration of which is shown in FIG. 3. When RESET is 1, the up-counter is initialized, and 0 appears at the output WP 2. When WRB=0 and the Full flag is 0, at the rising edge of CLK, the up-counter is incremented, at which point the WP 2 output changes to 1.

When WP indicates $2^{m+n}-1$ (WP=15 in FIG. 10), if WRB=0 and the Full flag is also 0, at the rising edge of CLK the up-counter is incremented, and the WP 2 output returns to 0. In other cases, incrementing is not done. In this manner, the above-noted processing is performed.

Figure 4:
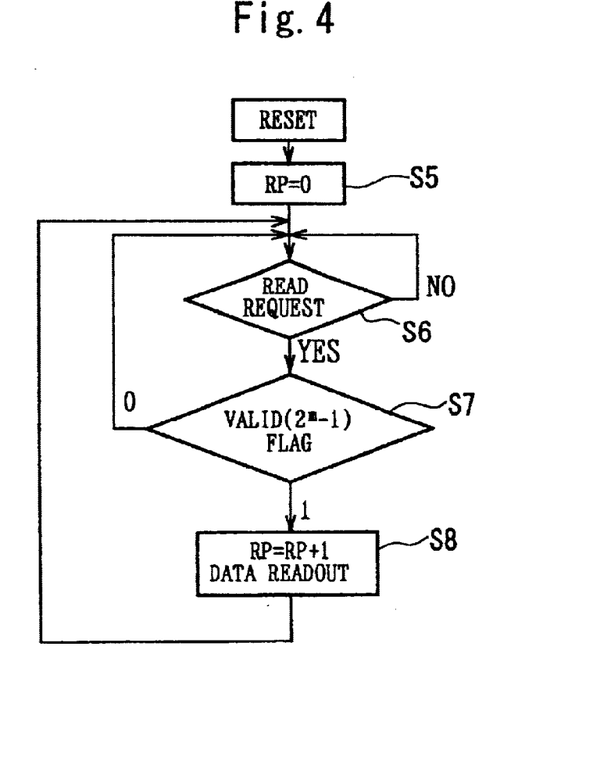
FIG. 4 is a flowchart that illustrates the operation of a reading pointer.

Next, the flow of the above-noted reading operation will be described, with reference to FIG. 4. When resetting is done, RP 4 changes to 0 (step S5) and if there is a read request, if the most significant bit of the Valid flag is 1 (steps S6 and S7), the RP 4 value is incremented by 1, and the read data is output to the data output line 12.

Figure 5:
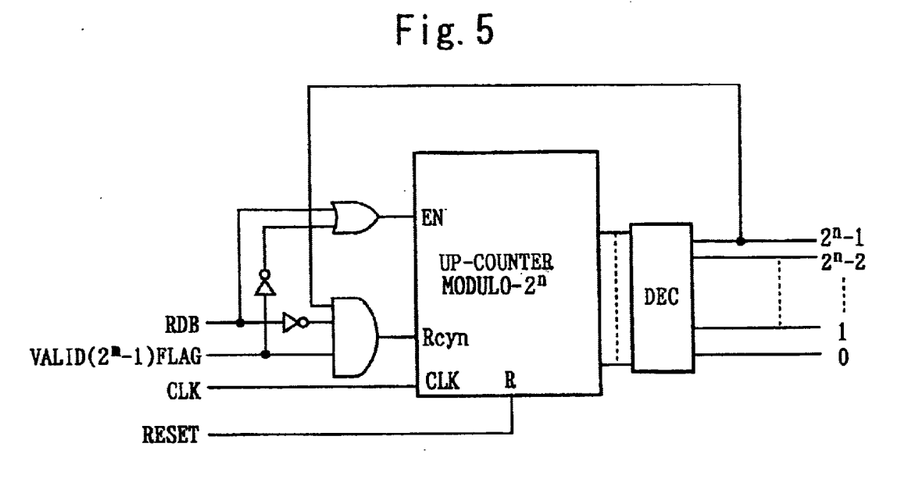
FIG. 5 is a block diagram of a reading pointer.

The reading pointer 4 of FIG. 1 is an up-counter, the more detailed configuration of which is shown in FIG. 5. When RESET=1, the up-counter is initialized, so that the RP 4 output changes to 0. When RDB=0, if the most significant bit of the Valid flag is 1, at the rising edge of CLK the up-counter is incremented, and the output of RP 4 changes to 1.

When RP indicates $2^n-1$ (RP=3 in FIG. 10), if RDB=0 and the most significant bit of the Valid flag is 1, at the rising edge of CLK the up-counter is incremented, and the output of RP returns to 0. In other cases, incrementing is not done. In this manner the above-noted processing is performed.

Figure 6:
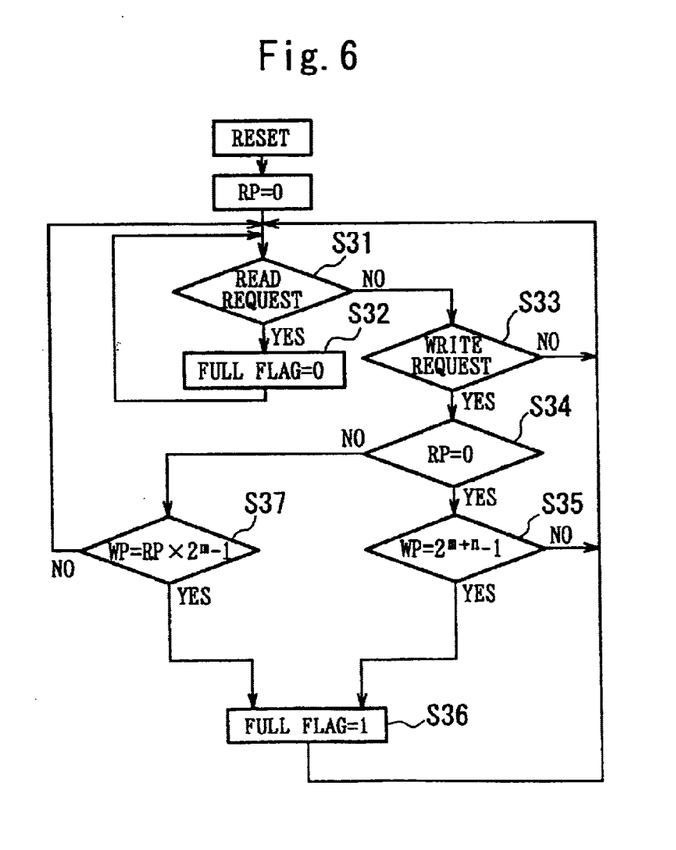
FIG. 6 is a flowchart that illustrates the full-flag condition.

Next, the operational flow of the full detection circuit 5 and the Full flag will be described, with reference to FIG. 6.

When resetting is done, the Full flag changes to 0, and if there is a read request, the Full flag is reset, changing to 0 (steps S31 and S32).

With the RP 4 value at 0, if a write request occurs (steps S33 and S34), if the value of WP is $(2^{m+n}-1)$, the Full flag is set to 1 (steps S35 and S36).

If a write request occurs with an RP value other than 0, if the value of WP is $(RP \times 2^m - 1)$, the Full flag is set to 1 (steps S34 and S37).

Figure 7:
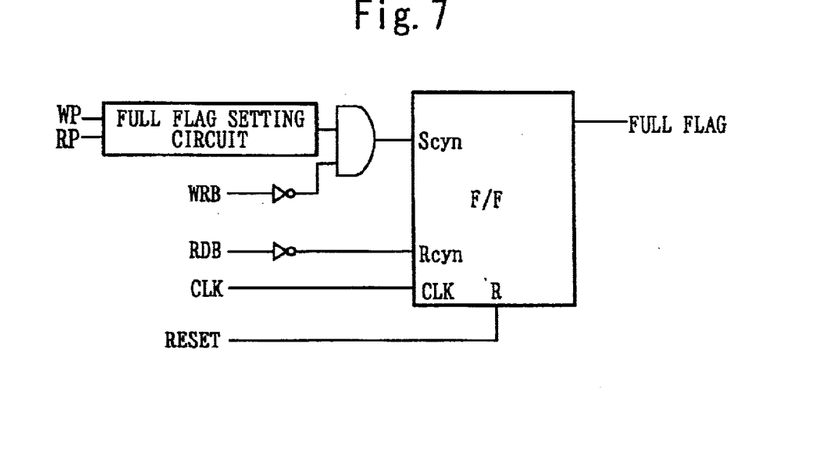
FIG. 7 is a block diagram of a full detection circuit.

The full detection circuit 5 shown in FIG. 1 has the configuration shown in FIG. 7.

With RESET=1, the Full flag changes to 0 and, if the above-described conditions are satisfied, with WRB=1, at the rising edge of CLK the Full flag is set to 1. With RDB=0, at the rising edge of CLK, the Full flag is set to 0. In this manner the above-noted processing is performed.

The operational flow of the above-noted valid judgment circuit 6 and the Valid flag are described below, with reference to FIG. 8.

Figure 8:
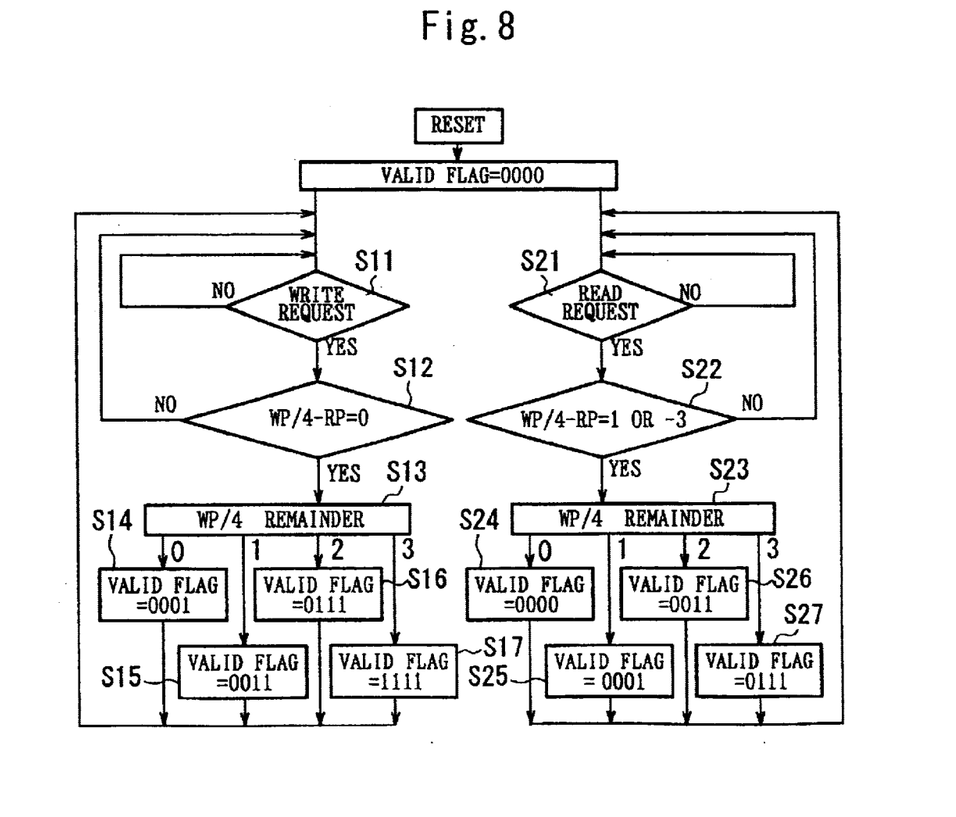
FIG. 8 is a flowchart that illustrates the valid flag condition.

In the description of FIG. 8 that follows, the RAM cell, WP and RP of FIG. 10(b) are used for the case of a 4-bit Valid flag.

When resetting is done, the Valid flag changes to 0000, and if a write request exists, if the difference obtained by subtracting the value of RP from the value obtained by dividing the value of WP by $2^m$ (4, because m=2) is 0, the Valid flag is set by the remainder obtained by dividing the WP value by $2^m$ (4, because m=2), each of the bits being set to 1 (steps S11 through S17).

If there is a read request, if the difference obtained by subtracting the value of RP from the value obtained by dividing the value of WP by $2^m$ (4, because m=2) is either 1 or −3, the Valid flag is reset by the remainder obtained by dividing the WP value by $2^m$ (4, because m=2), each of the bits being set to 0 (steps S21 through S27).

Figure 9:
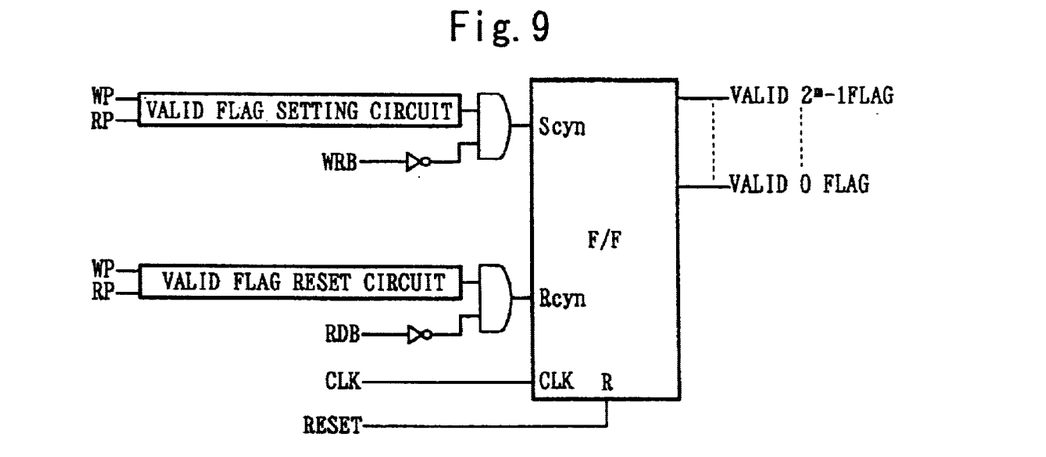
FIG. 9 is a block diagram of a valid judgment circuit.

The valid judgment circuit 6 is configured as shown in FIG. 9.

In FIG. 9, when RESET=1, the Valid flag changes to 0 and, if the above-described setting conditions are satisfied, with WRB=0, at the rising edge of CLK the Valid flag becomes 1.

When the above-described resetting conditions satisfied, with RDB=0, at the rising edge of CLK, the Valid flag changes to 0. In this manner the above-described processing is performed.

The data output circuit 3 selects N addresses $(N=2^m)$ of the RAM cell 1, connects to N $(N=2^m)$ columns of data (k bits) that are selected, and outputs the (N×k) bits of data to the data output line 12.

The RAM cell 1 is well known conventional device, since this is not directly related to the present invention, it will not be described in detail herein.

The operation of a FIFO memory device having 8 bits of input data, 32 bits of output data, and a RAM cell 1 that is made up of 16 words of 4 bits×4 bits is described below.

First, the specific configuration of the FIFO memory device shown in FIG. 10 will be described. In this drawing, the reference numeral 1 denotes a RAM cell, having a memory capacity of (4×4×8 (where k=8)) bits, in the form of $2^m$ rows×$2^n$ columns.

The reference numeral 7 is a write request signal WRB, 8 is a read request signal RDB, 9 is a clock signal (CLK), 10 is a reset signal RESET, and 11 is the data input lines. In the case of this example (in which k=8), k (8) bits of data are handled by the input data lines DATA0 through DATA7. The reference numeral 12 is the data output lines. In this example, in which N=4 and k=8, these output lines output 32 bits of data, on lines DOUT0 through DOUT31. The reference numeral 13 denotes a 1-bit Full flag.

The reference numeral 14 denotes a N-bit (4-bit) Valid flag, which indicates whether or not the 32 bits of data on the above-noted data output lines is valid. In the example shown, the Valid0 flag corresponds to DOUT0 through DOUT7, the Valid1 flag corresponds to DOUT8 through DOUT15, the Valid2 flag corresponds to DOUT16 through DOUT23, and the Valid3 flag corresponds to DOUT24 through DOUT31.

The reference numeral 2 is a hexadecimal up-counter of 2+2=4 bits, this serving as the writing pointer, which increments the write address of the RAM cell 1 by one at a time.

The reference numeral 3 is a data output circuit, which selects 1 row of RAM cell 1 addresses (where 1 row=$2^m$ ($2^m$=4)), and output 4×8 Bits data. That is, the number of the data output circuits 3 is $2^n$ ($2^n$=4), each selected data being output to the above-noted data output lines 12.

The reference numeral 4 denotes an n-bit (4-bit) up-counter which serves as a reading pointer, this operating as modulo-4 counter, which performs switching of the selected data of the above-noted data output circuit 3.

The reference numeral 5 denotes a full detection circuit, which detects the full condition of the RAM cell 1. In this example, if the RP 4 value is 0 and the WP 2 value is 15, or also if the difference is obtained by subtracting the RP 4 value×$2^m$ (where $2^m$=4) from the WP 2 value is −1 and the WRGB 7 is 0, at the rising edge of CLK 9, the above-noted Full flag is set to 1.

In the case in which RDB 8 is 0, at the rising edge of CLK 9, the above-noted Full flag 13 is set to 0.

The reference numeral 6 denotes a valid judgment circuit which judges whether or not the 32-bit data on the data output lines 12 is valid. In this example, if the difference obtained by subtracting the above-noted RP 4 value from the value obtained by dividing WP 2 by $2^m$ (where $2^m$=4) is 0 and also the remainder from that division is 0, when WRB 7 is 0, at the rising edge of CLK 9, the Valid flag 14 is output as 0000. However, if the remainder is 1, the Valid flag 14 is output as 0011, if the remainder is 2, the Valid flag 14 is output as 0111, and if the remainder is 3, the Valid flag 14 is output as 1111. When WRB 7 is 0, these flags are output at the rising edge of CLK 9.

If the difference obtained by subtracting the RP 4 value from the result of dividing the WP 2 value by $2^m$ (where $2^m$=4) is either 1 or −3 and also the remainder from that division is 0, when RDB 8 is 0, at the rising edge of CLK 9 the Valid flag 14 is set to 0000. If the remainder is 1, however, the Valid flag 14 is set to 0001, if the remainder is 2, the Valid flag 14 is set to 0011, and if the remainder is 3, the Valid flag 14 is set to 0111. When RDB 8 is 0, these flags are output at the rising edge of CLK 9.

Figure 11:
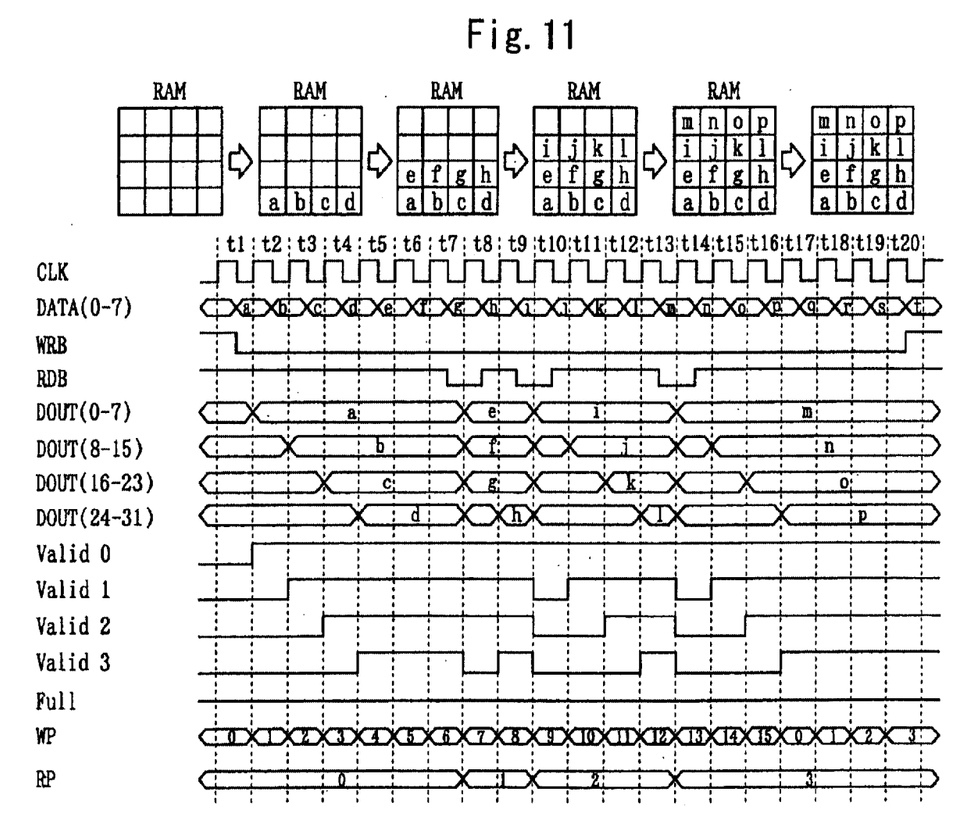
FIG. 11 is a timing diagram that illustrates writing and reading of data in the embodiment shown in FIG. 10.

The writing operations and reading operations and the operation of the Valid flag 14 are performing in accordance with the timing shown in FIG. 11, which is described below in detail.

The writing operation is performed from time t2 to time t20.

At time t2, the "a" data is written. When this is done, because the difference obtained by subtracting the above-noted RP 4 value from the value 0 obtained by dividing the WP 2 value 0 by $2^m$ (where $2^m$=4) is 0 and the remainder obtained by dividing the WP 2 value 0 by $2^m$ (where $2^m$=4) is 0, the Valid flag 14 is set to 0001. WP 2 changes to 1 and "a" is output to the data output lines 12.

At time t3, the "b" data is written. When this is done, because the difference obtained by subtracting the above-noted RP 4 value from the value 0 obtained by dividing the WP 2 value 1 by $2^m$ (where $2^m=4$) is 0 and the remainder obtained by dividing the WP 2 value 1 by $2^m$ (where $2^m=4$) is 1, the Valid flag 14 is set to 0011. WP 2 changes to 2 and "ab" is output to the data output lines 12.

At time t4, the "c" data is written. When this is done, because the difference obtained by subtracting the above-noted RP 4 value from the value 0 obtained by dividing the WP 2 value 2 by $2^m$ (where $2^m=4$) is 0 and the remainder obtained by dividing the WP 2 value 2 by $2^m$ (where $2^m=4$) is 2, the Valid flag 14 is set to 0111. WP 2 changes to 3 and "abc" is output to the data output lines 12.

At time t5, the "d" data is written. When this is done, because the difference obtained by subtracting the above-noted RP 4 value from the value 0 obtained by dividing the WP 2 value 3 by $2^m$ (where $2^m=4$) is 0 and the remainder obtained by dividing the WP 2 value 3 by $2^m$ (where $2^m=4$) is 3, the Valid flag 14 is set to 1111. WP 2 changes to 4 and "abcd" is output to the data output lines 12.

At time t6, the "e" data is written, and WP 2 changes to 5, at which time "abcd" is output to the data output lines 12.

At time t7, the "f" data is written, and WP 2 changes to 6, at which time "abcd" is output to the data output lines 12.

At time t8, the read request signal RDB changes to 0, and a read operation is performed. When this is done, the value of RP 4 changes to 1, the data of the data output circuit 3 is switched, and "efg" is output to the data output lines 12. Simultaneously, "g" is read. When this is done, the difference obtained by subtracting the RP 4 value of 1 from the value 1 that is obtained by dividing the WP 2 value 6 by $2^m=4$ is 0, and the remainder obtained by dividing the WP 2 value 6 by $2^m=4$ is 2, the Valid flag 14 becomes 0111, and the value of WP 2 becomes 7.

At time t9, the "h" data is written. When this is done, because the difference obtained by subtracting the value 1 of RP 4 from the value 1 obtained by dividing the WP 2 value of 7 by $2^m=4$ is 0, and the remainder obtained by dividing the WP 2 value of 7 by $2^m=4$ is 3, the Valid flag 14 becomes 1111, and the output 32-bit data "efgh" becomes valid. The value of WP 2 becomes 8.

At time t10, readout is performed, and the RP 4 value becomes 2. Simultaneous with this, the "i" data is written. When this is done, because the difference obtained by subtracting the value 2 of RP 4 from the value 2 obtained by dividing the WP 2 value of 8 by $2^m=4$ is 0, and the remainder obtained by dividing the WP 2 value of 8 by $2^m=4$ is 0, the Valid flag 14 becomes 0001, and "i" is output to the data output lines 12. The WP 2 value then becomes 9.

At time t11, the "j" data is written. When this is done, because the difference obtained by subtracting the value 2 of RP 4 from the value 2 obtained by dividing the WP 2 value 9 by $2^m=4$ is 0, and the remainder obtained by dividing the WP 2 value 9 by $2^m=4$ is 1, the Valid flag 14 becomes 0011. The WP 2 now becomes 10, and the "ij" data is output to the data output lines 12.

At time t12, the "k" data is written. When this is done, because the difference obtained by subtracting the value 2 of RP 4 from the value 2 obtained by dividing the WP 2 value 10 by $2^m=4$ is 0, and the remainder obtained by dividing the WP 2 value 10 by $2^m=4$ is 2, the Valid flag 14 becomes 0111. WP 2 now becomes 11, and the "ijk" data is output to the data output lines 12.

At time t3, the "1" data is written. When this is done, because the difference obtained by subtracting the value 2 of RP 4 from the value 2 obtained by dividing the WP 2 value 11 by $2^m=4$ is 0 and the remainder obtained by dividing the WP 2 value 11 by $2^m=4$ is 3, the Valid flag 14 becomes 1111. The WP 2 now becomes 12, and the "ijkl" data is output to the data output lines 12.

At time t14, readout is performed. The value of RP 4 becomes 3. Simultaneously with this, the "m" data is written. When this is done, because the difference obtained by subtracting the value 3 of RP 4 from the value 3 obtained by dividing the WP 2 value 12 by $2^m=4$ is 0, and the remainder obtained by dividing the WP 2 value 12 by $2^m=4$ is 0, the Valid flag 14 becomes 0001. The WP 2 now becomes 13, and the "m" data is output to the data output lines 12.

At the time t15, the "n" data is written. When this is done, because the difference obtained by subtracting the value 3 of RP 4 from the value 3 obtained by dividing the WP 2 value 13 by $2^m=4$ is 0, and the remainder obtained by dividing the WP 2 value 13 by $2^m=4$ is 1, the Valid flag 14 becomes 0011. The WP 2 now becomes 14, and the "mn" data is output to the data output lines 12.

At the time t16, the "o" data is written. When this is done, because the difference obtained by subtracting the value 3 of RP 4 from the value 3 obtained by dividing the WP 2 value 14 by $2^m=4$ is 0, and the remainder obtained by dividing the WP 2 value 14 by $2^m=4$ is 2, the Valid flag 14 becomes 0111. The WP 2 now becomes 15, and the "mno" data is output to the data output lines 12.

At the time t17, the "p" data is written. When this is done, because the difference obtained by subtracting the value 3 of RP 4 from the value 3 obtained by dividing the WP 2 value 15 by $2^m=4$ is 0, and the remainder obtained by dividing the WP 2 value 15 by $2^m=4$ is 3, the Valid flag 14 becomes 1111. The WP 2 now returns to 0, and the "mnop" data is output to the data output lines 12.

At the time t18, the "q" data is written, and the value of WP 2 becomes 1, with the "mnop" data being output to the data output lines 12.

Figure 12:
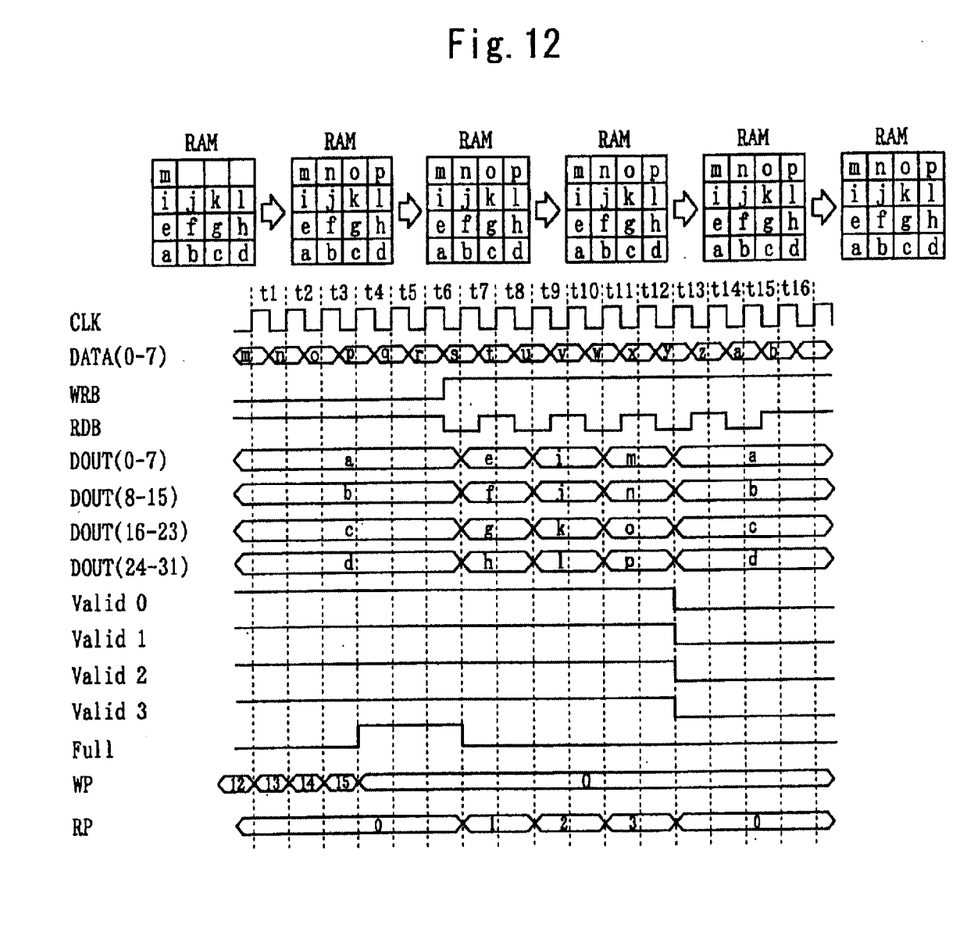
FIG. 12 is a timing diagram that illustrates writing and reading of data in the embodiment shown in FIG. 10.

Next, the operation of the Full flag 13 will be described, with reference being made to the timing diagram of FIG. 12. In this example, after resetting, reading is not done at all, data "a" through "n" being written, after which a write operation is being performed. That is, at t1 "m" data is written, at t2 "n" data is written, and at t3 "o" data is written, the value of WP 2 becoming 15 and, because readout has not been performed, "abcd" is output to the data output lines 12.

At time t4, the "p" data is written. When this is done, because the difference between the WP 2 value and the RP 4 value is 15, the Full detection circuit 5 detects the condition of data being fully written, thereby setting the Full flag 13 to 1, so that data writing is not possible until readout is performed. The value of WP 2 returns to 0.

At times t5 and t6, "q" and "r" data are written, respectively. Because the Full flag 13 is 1, however, WP 2 is not incremented, and the input data "q" and "r" are not written into the RAM cell 1. At time t7 the "efgh" data are read out, at time t9 the "ijkl" data are read out, at time t11 the "mnop" data are read out, and at the readout operation at time t13, because the difference obtained by subtracting the value 3 of RP 4 from the value 0 obtained by dividing the value 0 of WP 2 by $2^m=4$ is −3, and the remainder obtained by dividing the value 0 of WP 2 by $2^m=4$ is 0, the Valid flag 14 becomes 0000.

The value of RP 4 returns to 0, and the data of the data output circuit 3 is switched, with "abcd" data appearing on the data output lines 12. However, because the Valid flag 14 is 0000, the judgment is made that the data "abcd" on the data output lines 12 is invalid.

At time t15, readout is performed, but because the Valid flag 14 is 0000 the value of RP 4 is not incremented.

The second embodiment of the present invention, which is a FIFO memory device in which the input port has more bits than the output port, is described below.

Figure 13:
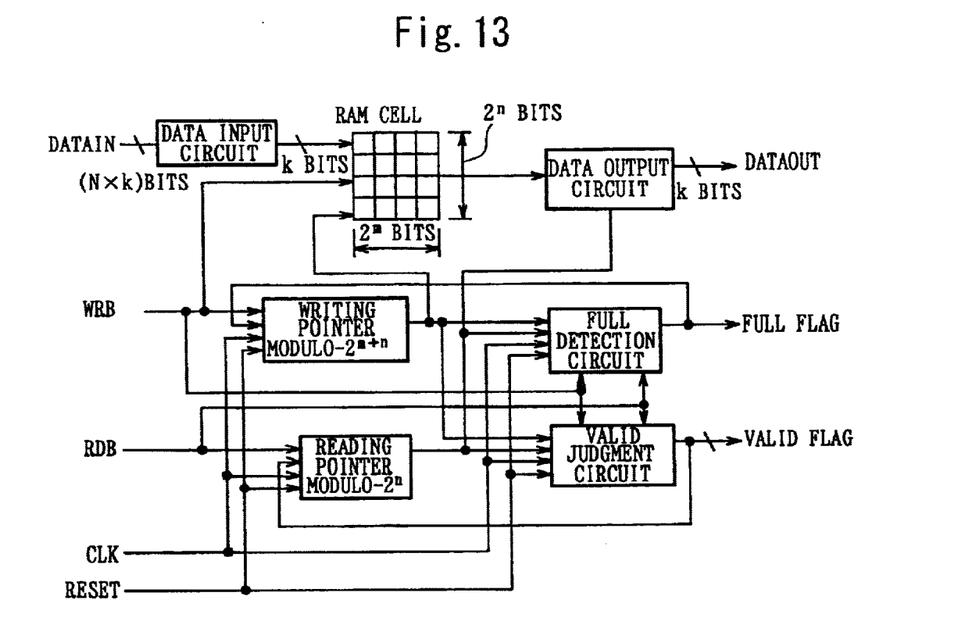
FIG. 13 is a block diagram that illustrates the second embodiment of the present invention.

FIG. 13 shows a FIFO memory device formed by a RAM cell that has a $2^m$ row×$2^n$ column structure ($2^m$×$2^n$×k bits of capacity), (N×k) bits of data input lines DATAIN, a data input circuit that divides data into units of k bits for input to the N (N=$2^m$) addresses of the RAM cell, an n-bit writing pointer (hereinafter abbreviated WP) that selects N (N=$2^m$) writing addresses of the RAM cell and increments the writing address one at a time, an k-bit data output line DATAOUT, a data output circuit that selects addresses of the RAM cell and outputs k bits of data to the above-noted data output lines DATAOUT, a (m+n)-bit reading pointer RP for the purpose of switching the data output circuit, a full detection circuit, which detects whether or not the above-noted RAM cell is full, a 1-bit full flag which is output from a full detection circuit, a valid judgment circuit which judges whether or not the data output to the above-noted output lines DATAOUT is valid, and a 1-bit Valid flag that is output from the above-noted valid judgment circuit.

As an example of this embodiment, the operation of a FIFO memory device having 32 bits of input data, 8 bits of output data, and a RAM cell that is made up of 16 words of 4 bits×4 bits is described below.

Figure 14:
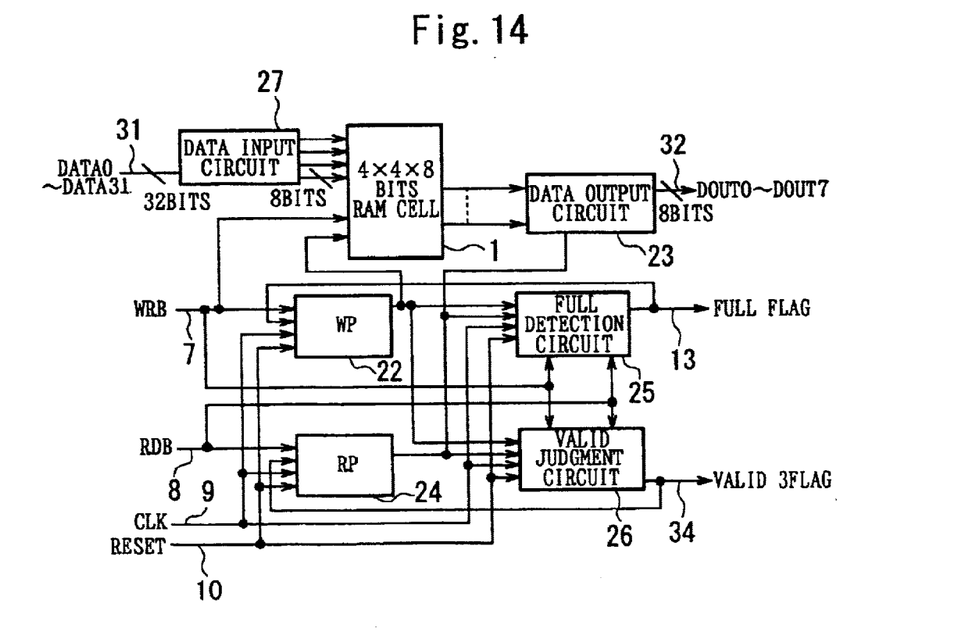
FIG. 14 is a block diagram that illustrates the embodiment of FIG. 13 in further detail.

First, the specific configuration of the FIFO memory device shown in FIG. 14 will be described. In FIG. 14, the reference numeral 1 denotes a RAM cell, having a memory capacity of 4×4×8 (where k=8) bits, in the form of $2^m$ rows×$2^n$ columns, 7 is a write control signal WRB, 8 is a read control signal RDB, 9 is a clock signal CLK, 10 is a reset signal (RESET), 31 is the data input lines having DATA0 through DATA31 lines, which in this example, handle (N×k)=4×8=32 bits of data, 27 is a data input circuit which divides the above-noted data input lines 31 into the 8-bit data groups DATA0 through DATA7, DATA8 through DATA15, DATA16 through DATA23, and DATA24 through DATA31, and inputs data into prescribed addresses in the above-noted RAM cell 1.

The reference numeral 32 is the data output lines DOUT0 through DOUT7, and in this example, the 8-bit output data are output from output circuit 23. The reference numeral 13 is a Full flag, this being a 1-bit signal.

The reference numeral 34 is a 1-bit flag that indicates whether or not the 8 bits of data on the above-noted data output lines 32 is valid, 22 is an n-bit (2-bit) up-counter that serves as a writing pointer, this being a modulo-4 up-counter, which selects 1 rows of RAM cell addresses (where 1 row=$2^m$ ($2^m$=4) ), and writes the data of the data input circuit 27 into prescribed addresses of RAM cell 1, the value of WP being incremented by 1 at a time.

The reference numeral 23 is a data output circuit that selects one address of the RAM cell 1 and outputs data to the data output lines 32, and the reference numeral 2324 is a (m+n=2+2=4)-bit up-counter that serves as a reading pointer, this being a hexadecimal counter which selects data from the data output circuit 23, and the Value of RP is incremented by 1.

The reference numeral 25 is a full detection circuit that detects the condition in which the RAM cell 1 is full, this circuit outputting a Full flag 13 of 1 at the rising edge of the clock CLK 9 if the WRB 7 is 0 for the case in which the difference obtained by subtracting the value obtained by dividing the RP 24 value by $2^m$=4 from the WP 22 value is either 3 or −1.

If the difference obtained by subtracting the value obtained by dividing the RP 24 value by $2^m$=4 from the WP 22 value is either −3 or 1 and the remainder obtained by dividing RP 24 by $2^m$=4 is 3, if RDB 8 is 0, at the rising edge of CLK 9 the Full flag 13 is output as 0.

The reference numeral 26 denotes a valid judgment circuit that judges whether or not the 8 bits of data on the data output lines 32 is valid. In this example, if the difference obtained by subtracting the value obtained by dividing the RP 24 value by $2^m$=4 from the WP 22 value is 0, when WRB 7 is 0, at the rising edge of the CLK 9, the Valid flag 34 is output as 1. If the difference obtained by subtracting the value obtained by dividing the RP 24 value by $2^m$=4 from the WP 22 value is either 3 or −1, if the remainder obtained by dividing the value of RP 24 by $2^m$=4 is 3, when RDB is 0, at the rising edge of the CLK 9 the Valid flag 34 is output as 0. The writing operating, reading operation, Full flag 13 operation, and Valid flag 34 operation are described below, with reference being made to the timing diagram of FIG. 15. The write operation is performed between times t2 and t5.

Figure 15:
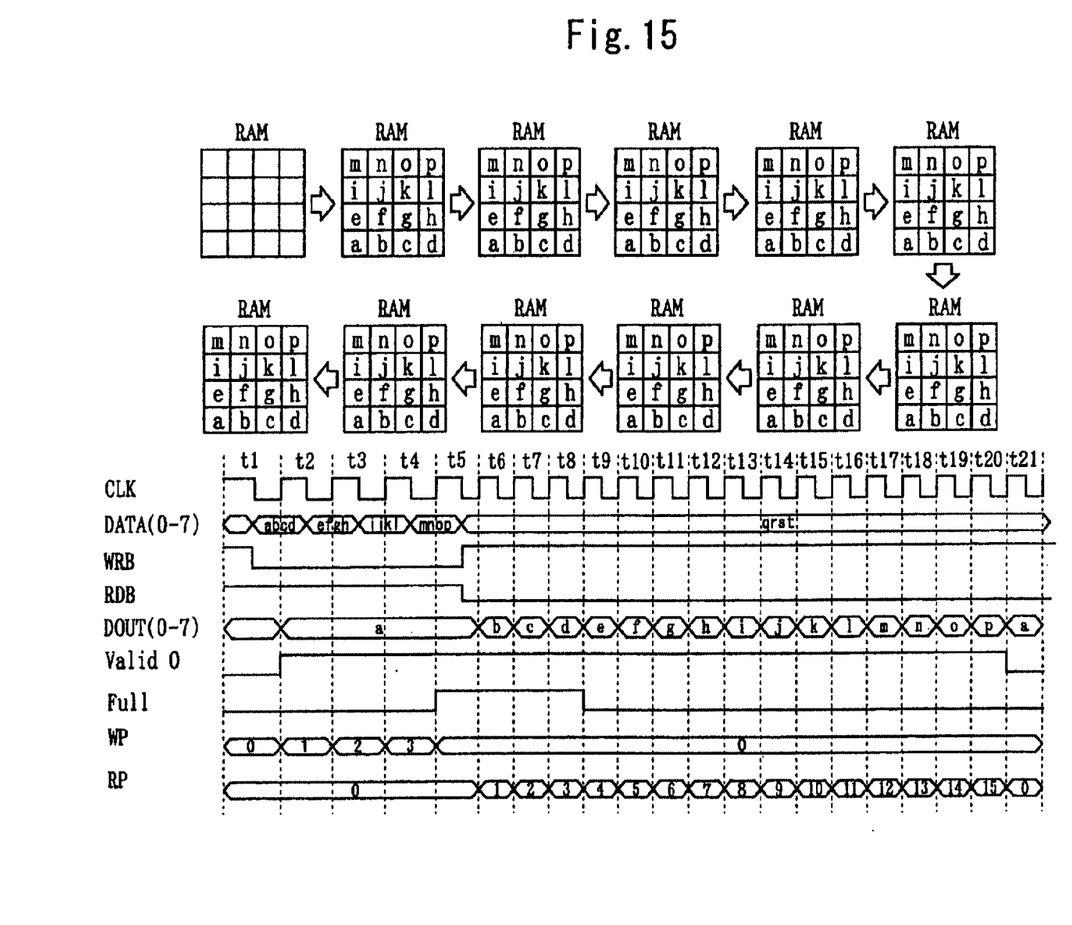
FIG. 15 is a timing diagram of writing and reading of data in the embodiment shown in FIG. 13.

At time t2, the "abcd" data is written. When this is done, because the difference obtained by subtracting the value obtained by dividing the RP 24 value 0 by $2^m$=4 from the WP 22 value 0 is 0, the Valid flag 34 becomes 1, and readout is possible.

The WP 22 changes to 1, and the "a" data is output to the data output lines 32.

At time t3, the "efgh" data is written. When this is done, the WP 22 changes to 2.

At time t4, the "ijkl" data is written, at which point WP 22 changes to 3.

At time t5, the "mnop" data is written. When this is done, because the difference obtained by subtracting the value obtained by dividing the RP 24 value 0 by $2^m$=4 from the WP 22 value is 3, the above-noted full detection circuit 25 detects the full condition, and sets the Full flag 13 to 1 so that writing is not possible until reading is performed. At this time, the WP 22 value returns to 0.

At time t6, readout is performed, the value of RP 24 changes to 1, the selected data of the data output circuit 23 is switched, and the "b" data is output to the data output lines 32.

Readout is done at time t7, at which time RP 24 changes to 2, the selected data of the data output circuit 23 is switched, and the "c" data is output to the data output lines 32.

Then readout is done at time t8, at which time RP 24 changes to 3, the selected data of the data output circuit 23 is switched, and the "d" data is output to the data output lines 32.

At time t9 readout is performed. When this is done, because the difference obtained by subtracting the value 0 obtained by dividing the RP 24 value 3 by $2^m$=4 from the WP 22 value 0 is −3, and the remainder obtained by dividing the RP 24 value 3 by $2^m$=4 is 3, the Full flag 13 becomes 0, and writing is possible. The value of RP 24 changes to 4, the selected data of the data output circuit 23 is switched, and the "e" data is output to the data output lines 32.

When readout of data is done at time t21, the difference obtained by subtracting the value 3 obtained by dividing the RP 24 value 15 by $2^m$=4 from the WP 22 value 0 is −3, and the remainder obtained by dividing the RP 24 value 15 by $2^m$=4 is 3, the Valid flag 34 changes to 0, which indicates that the "a" data that is output to the data output lines 32 is invalid.

The third embodiment of the present invention is described below.

Figure 16:
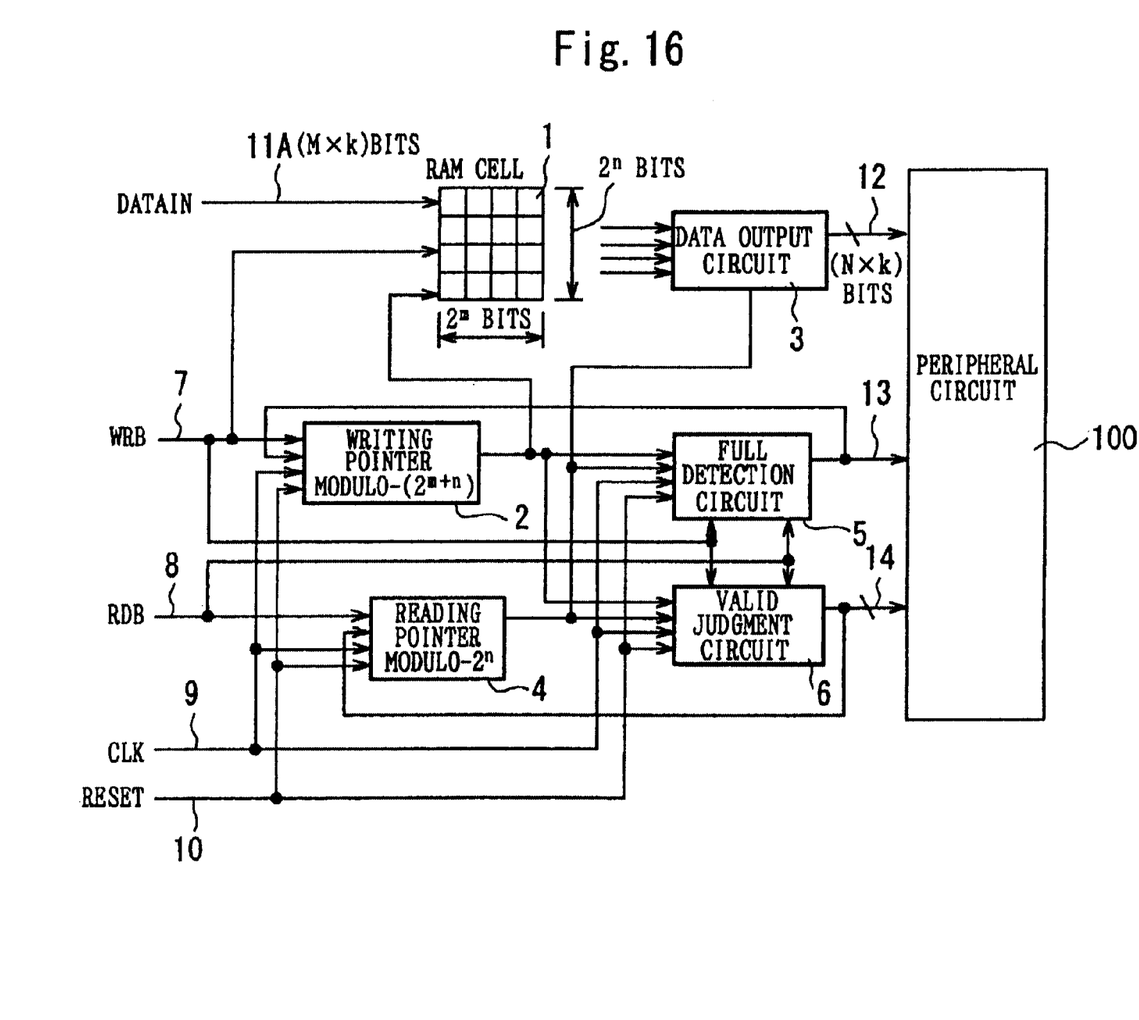
FIG. 16 is a block diagram that illustrates the third embodiment of the present invention.

FIG. 16 illustrates a FIFO memory device that is used in data transfer between data processing apparatuses having different data bus widths, comprising: an input circuit 11A with a data bus width of M×k bits (where M is an integer greater than 1); an output circuit 12 with a data bus width of N×k bits (where N is an integer greater than 1, and different from said M) that outputs read-out data within said FIFO memory device; a writing pointer 2 that points to a data writing address of said FIFO memory device; a reading pointer 4 that points to a data reading address of said FIFO memory device; and a valid/invalid indicating circuit 6 which indicates whether or not said read-out data output to said output circuit is valid, said data output from said valid/invalid indicating circuit is output to a peripheral circuit 100 of said FIFO memory device in every k bits as one unit.

By adopting the configuration described above, a FIFO memory device and a method for controlling a FIFO memory device according to the present invention not only enable simultaneous writing and reading of data without the need for bus arbitration, but also prevent such problems as skipped writing and double reading of data, and enable high-speed transfer of data.

What is claimed is:

1. A FIFO memory device that is used in data transfer between data processing apparatuses having different data bus widths from each other, comprising:

an input circuit of said FIFO memory device with a data bus width of M×k bits (where M and k are integers greater than 1);

a memory provided within said FIFO memory device, said memory having a row width;

an output circuit of said FIFO memory device with a data bus width of N×k bits (where N is an integer greater than 1, but being different from said M) that outputs read-out data from said memory provided within said FIFO memory device;

a writing pointer that points to a data writing address of said memory provided within said FIFO memory device;

a reading pointer that points to a data reading address of said memory provided within said FIFO memory device; and a valid/invalid indicating circuit which outputs validity data indicating whether or not said read-out data output to said output circuit is valid;

wherein said validity data is determined by said valid/invalid indicating circuit based on said data writing address, said data reading address, and the row width of said memory provided within said FIFO memory device, wherein at each time when said read-out data is output to said output circuit, said valid/invalid indicating circuit outputs said validity data as a flag signal that indicates whether or not said read-out data is valid, and also outputs one flag signal in every k bits;

wherein said flag signal is determined by subtracting said data reading address from a value obtained by dividing a value of said data writing address by $2^m$, wherein m represents the row width of said memory provided within said FIFO memory device.

2. The FIFO memory device according to claim 1, wherein said flag signal comprises N bits.

3. The FIFO memory device according to claim 2, wherein said reading pointer has a value and the value is incrementable only when all bits of said flag signal indicate said read-out data to be valid.

4. A method of controlling a FIFO memory device which is used for data transfer between data processing apparatuses having different data bus widths from each other, comprising:

obtaining from a writing pointer a data writing address;

obtaining from a reading pointer a data reading address;

constantly reading data from a memory provided within said FIFO mew device at said data reading address;

constantly outputting to an output circuit said read data; and determining the validity of said read data based on said data writing address, said data reading address, and the row width of said memory provided within said FIFO memory device, wherein said validity determination is performed by subtracting said data reading address from a value obtained by dividing a value of said data writing address by $2^m$, wherein m represents the row width of said memory provided within said FIFO memory device.

* * * * *